April 3, 1951 H. A. DU BOIS 2,547,903
AUDIO AUTOMATIC VOLUME CONTROL SYSTEM
Filed April 3, 1947
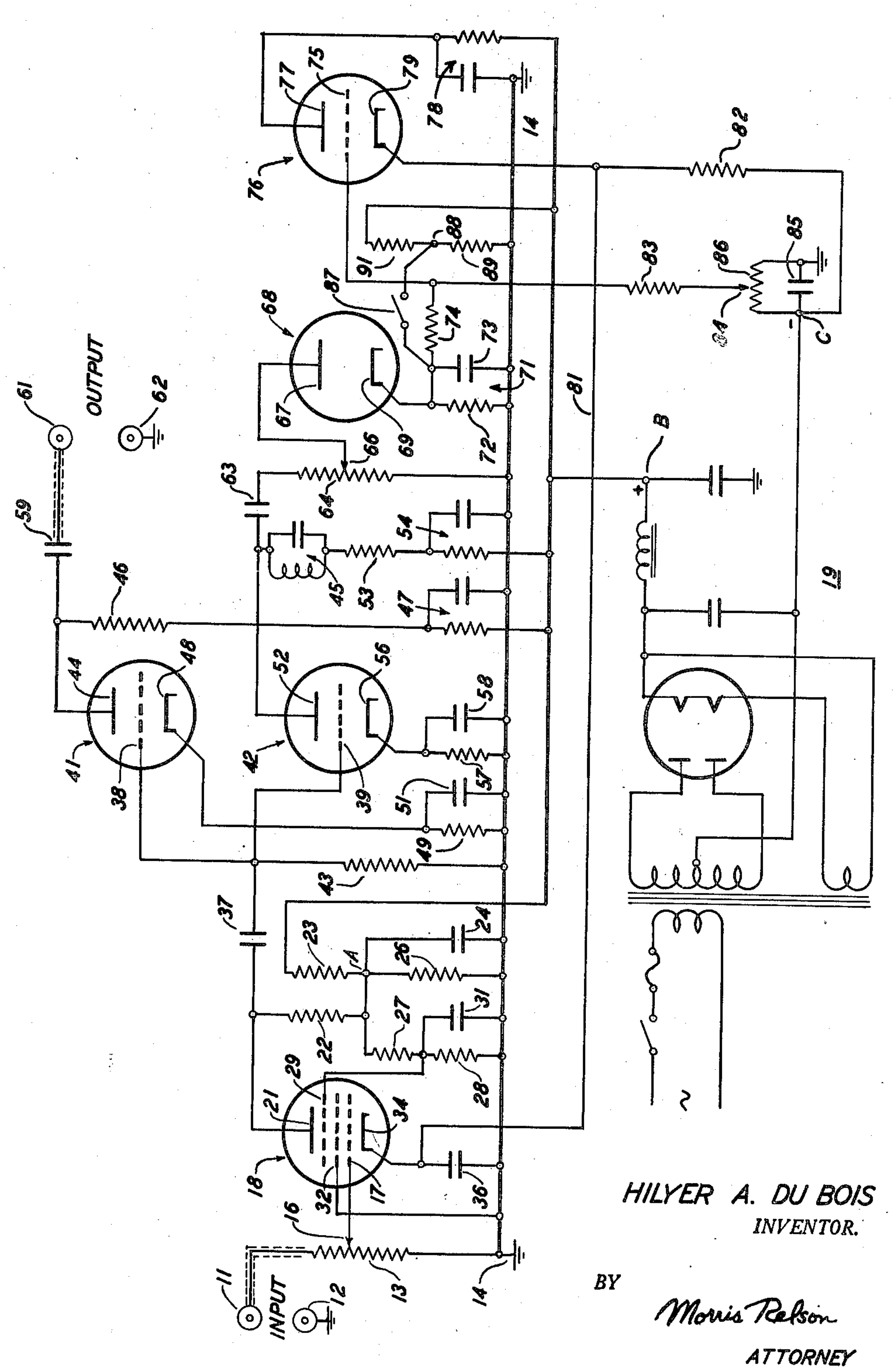
HILYER A. DU BOIS
INVENTOR.
BY Morris Relson
ATTORNEY Patented Apr. 3, 1951

2,547,903

UNITED STATES PATENT OFFICE 2,547,903

AUDIO AUTOMATIC VOLUME CONTROL SYSTEM

Hilyer A. Du Bois, Hempstead, N. Y., assignor of one-half to Eugene J. Venaglia, East Hempstead, N. Y.

Application April 3, 1947, Serial No. 739,129

4 Claims. (Cl. 179—171)

The present invention relates to the art including electronic circuits for the control of the output volume of an audio amplifier system, and more particularly to audio automatic volume control systems.

In entertainment systems where phonograph records are reproduced as a background for other activities, such as in coin-operated electric phonographs (known as "juke boxes"), in wire distribution of dance and other music (as in the "Musak" system), or in the musical background supplied for aid in work activities, or for skating rinks, restaurants, or other similar places, an annoying problem is caused by the great differences in volume level found in different records or even in different parts of the same record. Such differences in recorded volume, when reproduced by the ordinary amplifier and reproducer system, produce marked differences in the sound level produced, to the extent that it is often necessary to readjust the volume control of the reproducer system many times during the course of a short time; otherwise, listeners are subjected to annoying loudness at one instant, and are unable to hear the composition being played the next moment. This requirement is extremely annoying and offers a marked limitation to the enjoyment and auditory comfort of the listener, which is reflected in the extent to which such systems are accepted by the proprietors of various establishments. Similar problems arise in microphone amplifying systems, such as public address or dictograph devices; in radio transmitting, where it is important to keep as close to 100% modulation as possible without exceeding that limit; in magnetic recording systems, where it is important to get high magnetization without producing saturation of the recording medium; and in many other similar instances.

While this problem has been long appreciated in this field, no known satisfactory solution therefor has been devised up to now. In the case of coin-operated electric phonographs, where any one of a group of records may be selected at the will of the user, a crude attempt to obtain the benefits of the present invention has been made by providing an individual volume control for such record, whereby all the signals from all records could be adjusted to approximately a common level. However, this system has serious draw-backs in that it does not eliminate the wide differences in level between the several passages in the same record, and would require re-adjustment of these controls each time a record is substituted. For the other type of commercial reproduction records indicated above, where no fixed group of records is used, this system, of course, cannot be used, and it has been common practice to require the services of a trained operator to monitor and adjust the level of each record or each record passage during operation.

Attempts have been made to provide automatic controls for audio amplifiers to take care of this situation. However, all known systems of this type suffer from any of several disadvantages, including excessive complexity of circuit, unpleasant distortion of the output (evidenced by elimination of "expression" and by rapid fluctuations between high and low level, often termed "pumping" action), lack of adequate uniformity of control, and lack of range of volume variations which can be accommodate. In general, such prior systems have not been able to give adequate uniformity of output level over a wide range of signal amplitude variations, without introducing excessive distortion. Also, such systems have been subjected to excessive noise and scratch effects which impair the fidelity and enjoyability of their output.

According to the present invention, these objections to the customary systems are overcome almost entirely by the addition of an improved audio A. V. C. circuit, which retains the output level of a sound-reproducing system very close to a constant average value, without impairing to an appreciable extent the quality, tone, and dynamic expression of the output, over the entire range of changes in level normally encountered. This is done in the present invention by providing an improved and novel circuit adapted to be connected between the customary phonograph pickup or other signal source and the input to its amplifier, this circuit being controlled by the pickup or source voltage to control the level of the voltage supplied to the amplifier so as to maintain the loudspeaker volume substantially constant at an easily adjustable level. The invention can be provided in the form of an attachment for insertion into existing sound-reproducing or utilizing systems, merely by opening the connection in the existing system between the sound signal source (such as pickup, telephone line, or microphone) and the signal utilization device (such as loudspeaker amplifier or recorder amplifier).

Accordingly it is an object of the persent invention to provide an improved audio A. V. C. circuit for maintaining the output of a sound-reproducing or amplifying system at substantially uniform level, without interfering with quality or dynamic expression, and over a very wide range of possible variations in the input amplitudes.

It is another object of the present invention to provide an improved audio A. V. C. circuit incorporating special circuits for preventing or minimizing undesirable noise effects.

The above and other features and advantages of the invention will become apparent from a consideration of the following description taken in conjunction with the appended drawings showing a preferred embodiment of the inventions in the form of an attachment for automatic electric phonographs, although it will be understood that the invention is applicable much more generally, in almost any audio circuit where the results produced by the present invention are desirable.

The single figure shows a schematic circuit diagram of a preferred embodiment of the present invention, illustrated in the form of a self-contained circuit, especially adapted to be interposed between the pick-up and amplifier of a conventional electric phonograph system. However, it will be understood that this circuit may be connected between any source of electrical sound or audio signals and a reproducer or utilization device therefor. Thus, in a public address system, it may be connected between microphone and loud-speaker, while in a sound recording system it would be connected between microphone and recorder. Other similar uses will become apparent to persons familiar with this art.

In this circuit, a pair of input terminals 11 and 12 are provided, terminal 11 being connected to one end of an input control potentiometer 13 whose other end is grounded at 14, and terminal 12 also being grounded, whereby the input voice or other signals are impressed across potentiometer 13. The variable tap 16 of potentiometer 13 is connected to the control grid 17 of a control amplifier tube 18, which is preferably of the remote cut-off type, such as the standard type 6L7 tube. A conventional rectifier power supply 19 is provided, which produces a positive voltage with respect to ground at terminal B suitable for plate supply, and also produces a negative voltage at terminal C suitable for a grid bias supply. As an illustrative example, terminal B might have a potential of 350 to 400 volts positive and terminal C might have a potential of 30 to 60 volts negative, it being understood that wherever voltage magnitudes or polarities are given herein, the reference datum is ground.

The anode 21 of control tube 18 is connected to the plate supply terminal B by way of a load resistor 22 and an isolating filter network comprising current-limiting resistor 23 and condenser 24. Resistor 26, connected in series with resistor 23 between plate supply terminal B and ground 14, provides a voltage divider maintaining the junction point A at a fixed potential suitable for the plate supply for control tube 18. A further voltage divider, provided by resistors 27 and 28, is connected between point A and ground, and the junction of resistors 27 and 28 is then connected to the screen grid 29 of control tube 18, this junction point being by-passed to ground with respect to audio frequencies by condenser 31. The No. 3 grid 32 of tube 18 is connected directly to ground, while the cathode 34 of control tube 18 is connected to ground through a large-value condenser 36, which has the important function, in addition to that described hereinafter, of grounding cathode 34 as to alternating currents, so that no degenerative action occurs, and the amplification of tube 18 is not decreased.

The anode 21 of control tube 18 is also connected through an audio coupling condenser 37 to the control grids 38 and 39 of a pair of amplifier tubes 41, 42, a grid coupling resistor 43 being connected between grids 38 and 39 and ground. As will be seen, amplifier tube 41 serves as an isolation or buffer amplifier, while amplifier tube 42 is the control signal amplifier.

Amplifier stages 41 and 42 are of conventional design. Thus the anode 44 of isolation amplifier tube 41 is connected through a load resistor 46 and an isolating and current-limiting filter 47 to the plate supply terminal B, and its cathode 48 is connected to ground through a cathode-biasing resistor 49 having a by-pass condenser 51. Similarly, the anode 52 of control signal amplifier tube 42 is connected to the plate supply terminal B through a noise-suppressing resonant circuit 45 (described below), a load resistor 53, and an isolating and current-limiting filter arrangement 54, while the cathode 56 of tube 42 is connected to ground through a cathode-biasing resistor 57 having a by-pass condenser 58.

The anode 44 of isolation amplifier tube 41 is also connected through an audio coupling condenser 59 to one output terminal 61, the other output terminal 62 being connected to ground. As will be described in detail below, terminals 61 and 62 are connected to a loud-speaker or recorder or other desired utilization device for the controlled audio currents, though as many amplifier stages as may be desired.

The anode 52 of control signal amplifier tube 42 is connected through an audio coupling condenser 63 to one terminal of compression-control potentiometer 64 whose other end is grounded. The variable potentiometer tap 66 is connected to the anode 67 of a control signal rectifier tube 68 whose cathode 69 is connected to ground through a time-constant circuit 71, provided by a resistor 72 shunted by a condenser 73.

Cathode 69 is also connected through an isolating resistor 74 to the grid 75 of a cathode coupled tube 76 whose anode 77 is connected to the plate supply terminal B through an isolating and current-limiting filter 78. The cathode 79 of tube 76 is connected by lead 81 directly to the control tube cathode 34 and also through a load resistor 82 to the negative potential terminal C. The grid 75 of tube 76 is provided with proper bias by its connection through an isolating resistor 83 to the movable tap 84 of a potentiometer 86 connected between the negative potential terminal C and ground, an alternating current bypass being provided by condenser 85.

The cathode 69 of rectifier 68 is also connected through a muting switch 87, hereinafter described, to the junction 88 of a pair of resistors 89, 91 connected between the positive potential terminal B and ground, and thereby providing a voltage divider for applying a predesigned positive potential to cathode 69 upon the closing of switch 87.

Having thus described the circuit of the present invention, its operation will now be discussed. As indicated above, the input terminals 11 and 12 are supplied with audio signals which may vary widely in amplitude level. It is the purpose of the present invention to provide an audio output at terminals 61, 62, which is as nearly as possible indistinguishable from the input signals supplied to input terminals 11, 12, except that the average amplitude level of the output signals from terminals 61, 62 is maintained very nearly uniform.

In the present circuit, the input signals supplied to terminals 11, 12 are impressed upon the control grid 17 of the control amplifier 18 through the potentiometer 13, which provides an input level control. This control is normally adjusted in the absence of automatic volume control to a value just below that at which distortion would occur. The input signal is therefore amplified by control tube 18 and is then fed to isolation amplifier 41 where it is further amplified before being supplied to the output terminals 61, 62. Amplifier 41 serves as an isolation or buffer amplifier; however, where such isolation is not desired or needed, the output terminal 61 could be coupled directly to the grid 39 of amplifier tube 42, or, through a coupling condenser such as 59, to anode 21 or to anode 52. Control signal amplifier tube 42 merely serves to increase the level of the audio control signal which, when thus amplified, is supplied to the rectifier 68 through the potentiometer 64, which serves as a control for the automatic volume control system to adjust range of compression of the output signals relative to the input signals. The rectified output of rectifier 68 appears across the time-constant circuit 71 as a unidirectional potential positive with respect to ground. This potential is supplied to the grid 75 of cathode-coupled tube 76 and varies its negative bias to thereby vary the current flowing through its load resistor 82.

As is readily seen, the bias for the control amplifier 18 is equal to the potential of the negative potential supply terminal C less the volt-drop across resistor 82. In normal operation, the grid control potentiometer 86 for tube 76 is so adjusted at zero compression (when tap 66 of compression control 64 is at its lowest point) that the potential of control amplifier cathode 34 is at a desired positive potential relative to ground. For example, for the 6L7 tube, cathode 34 is given a normal positive bias of 1.5 volts thus making grid 17 negative relative to cathode 34 by this amount. To attain this value, the grid 75 of tube 76 has a negative potential of approximately 9 volts. Upon setting the compression control 64 to a desired value of compression other than zero, the potential of rectifier cathode 69 is made more positive, so that the grid bias for tube 76 is also made more positive, thereby drawing more current through its load resistor 82. This raises the potential of control amplifier cathode 34 and correspondingly renders more negative the grid bias of control amplifier 18, thereby lowering the operating point of control tube 18 from the adjusted upper limit, indicated above, to a more suitable operating level dictated by the input signal itself.

If the input signal level supplied to terminals 11, 12 should increase, a greater control voltage would be supplied to the rectifier 68, producing a greater positive voltage across the time-constant circuit 71 to drive the bias of grid 75 more positive, whereby the volt-drop across resistor 82 is increased. In this way the positive potential of control tube cathode 34 is increased, thereby increasing the negative bias on control tube grid 17. As is well known, the amplification of remote cut-off tubes such as the 6L7 varies with grid bias, being greatest when the control grid is most positive and being smallest when the grid is most negative, just above cut-off. Hence, in the present circuit, an increase in input signal level operates through control signal amplifier 42, rectifier 68, and cathode-coupled tube 76 to drive the control grid 17, the No. 3 grid 32 and the screen grid 29 more negative and to reduce its amplification. Hence the change in output level in response to a given change in input level is much smaller than the input level change. By adjustment of compression control 64, the amount of output level change for a given input level change can be varied as desired, from zero when zero input is supplied to rectifier 68 to maximum when full input is fed to rectifier 68.

According to an important characteristic of the present invention, provision is made to prevent distortion or change in the apparent quality of the output signal relative to the input signal. For this purpose the time-constant circuit 71 is designed to have a relatively long time-constant such as of the order of 8 seconds, whereby it does not respond instantaneously to changes in input signals, but rather integrates or averages out the signal level changes so that it maintains a potential corresponding to the average level of the input signal. In this way, a sudden change of input level, such as due, for example, to an abrupt loud musical passage, is not instantaneously suppressed, but the high intensity signal or loud passage is at first transmitted unimpaired by the control amplifier 18 and isolation amplifier 41 to the output terminals 61, 62. However, if the loud passage were sustained, the voltage across the time-constant circuit 71 will build up shortly, and the level of the signal will be reduced closer to the average level desired. In this way the true psychological sensation of the original passage is maintained, since the ear obtains a true sensation of sudden loudness due to the first abrupt change or "attack" of the input signal. After this first abrupt sensation, the ear hardly perceives the gradual lowering of level caused by the time-constant circuit 71, so that the true auditory effect is preserved without the concomitant disadvantage of maintaining continuous high output level.

For sudden, short, or staccato, loud signals, the circuit has little or no effect, since such a short loud signal is completely passed by the control amplifier before the time-constant circuit permits a variation in its bias. Also, the averaged effect of a short loud signal is very small, so that only a small change in the time-constant circuit voltage is produced, causing only an insubstantial change in control amplifier bias.

The true psychological sensation is further preserved by causing the system to respond much more slowly to decreases in signal amplitude level than to equivalent increases in level. As is well known, the human ear is a logarithmically responsive instrument, so that a given change in amplitude level produces a larger sensation for an increase in level than for a decrease. This effect is relied upon in the present system to minimize alteration of the apparent quality or dynamic expression of the output signals while keeping substantially uniform output level. Since the human ear is relatively less sensitive to decreases in level, it is possible to make the control system less responsive to decreases in level, without the listener becoming aware of any distortion. For this purpose, the "decay" time-constant is made much longer than the "attack" time-constant. The net result is to permit more even output level without any impression of "flatness" being received by the listener.

Thus, the present system responds more slowly to decreases in signal level than to increases. This is accomplished by the conjoint effect of two parts of the circuit, the first including the rectifier 68 and time-constant circuit 71, while the second includes the tube 76 and the circuit formed by condenser 36 and resistor 82.

It will be noted that the charging circuit for the time-constant circuit condenser 73 extends by way of potentiometer 64 and the internal impedance of rectifier 68. During rectification (at the positive half-cycles of the audio voltage impressed on rectifier anode 67) the rectifier impedance is very low, of the order of a few hundred ohms. Hence the charging circuit resistance for condenser 73 is determined almost solely by potentiometer 64, whose resistance is selected to provide the desired "attack" time-constant for circuit 71. This time-constant will of course vary with the setting of potentiometer 64, being smallest for the largest values of compression. Hence, for largest compression, the "attack" time-constant is least, providing "tighter" automatic audio volume control.

For the negative half-cycles of the audio control voltage impressed upon rectifier 68, and when the voltage across condenser 73 exceeds the peak audio control voltage (so that rectifier anode 67 is negative relative to rectifier cathode 69), as is characteristic during decrease in input signal level, the rectifier tube has a very high, substantially infinite, internal impedance. Hence condenser 73 can discharge only through resistor 72, which has a high value producing the desired large "decay" time-constant.

A similar effect is produced with respect to condenser 36, whose voltage supplies the bias for control tube 18. Thus, in response to any positive change in the potential of grid 75, consequent upon an increase in input level, condenser 36 is charged up almost immediately through the relatively low impedance circuit provided by the tube 76, which, when conductive, has only a few hundred ohms of impedance. Thus, any increase in signal level, as represented by an increase in the voltage across the time-constant circuit 71, is effective substantially immediately to alter the amplification characteristic of control tube 18 so that the circuit has a relatively fast response to increased loudness. This is an important advantage, since it is undue loudness which is most objectionable in systems of this type. However, this response is not made so fast as to impair the above-discussed desired dynamic expression produced by immediate loudness followed by slow reduction in level toward the desired mean value.

In response to a decrease in signal level, which makes the potential of the control grid 75 more negative, condenser 36 can discharge only through resistor 82 and potentiometer 86, which are resistances of the order of tens of thousands of ohms, thus providing a relatively high time-constant for "decay," whereby the output signal level can be maintained very close to the average value desired, without destroying the desired auditory effect of dynamic expression and natural reproduction.

Thus, the control system has a smaller time-constant for increases in input signal level than for decreases in input signal level, which produces an extremely desirable overall effect.

An important aspect of the present system resides in the use of the cathode-coupled tube 76 as a control for the cathode potential of the control amplifier 18, rather than for the potential of any other electrode of amplifier 18. While the reasons for this are not fully understood, it has been definitely determined that audio automatic volume control of tube 18 by cathode control rather than by any other form of control cures best the defects found in prior known types of similar systems, especially with respect to distortion of the output signal and destruction of dynamic expansion, which has long been characteristic of such prior systems. In the present system, distortion of the output signals is completely unnoticeable, thereby for the first time making audio A. V. C. practicable. It is believed that the major reason for the improved operation of the present system stems from the fact that control of the cathode potential simultaneously modifies control grid, screen grid, and anode potentials, whereas prior systems customarily only actuate the control grid, thereby not attaining the advantages of the present invention.

The cathode-coupled tube 76 is highly useful in conjunction with cathode actuation of the control tube 18, since appreciable power is required for altering the voltage of condenser 36; the cathode-coupled tube 76 is peculiarly capable among amplifier types of providing this necessary power transfer, since it is a power amplifier circuit. The connection of tube 76 and control tube 18 is a strikingly simple one, and readily lends itself to the use, where desired, of conventional dual-purpose tubes incorporating both remote cut-off and conventional tubes in a single envelope.

A further important aspect of the present circuit resides in the use of the voltage-dividing resistors 27 and 28 for control amplifier screen grid 29. Since the potential of this screen grid relative to cathode changes as cathode 34 has its potential varied by tube 76, the screen grid current must correspondingly change. However, condenser 31 must have a large capacitance (for example, 10 microfarads) to avoid hum and audio-distortion. Hence resistor 28 is necessary to permit the potential of screen grid 29 to readjust readily to changes in operating conditions. This assists greatly in preventing customary distortion in the output of control amplifier 18.

The present invention solves a further problem which arises with respect to electrical phonographs, especially of the coin-operated type. During a change in records, it is customary to have a muting switch which disables the loudspeaker during the time the changing mechanism is operating. This switch re-connects the loud speaker as soon as the mechanism has finished changing the record, in preparation for the reproduction of the audio signals from the phonograph pick-up. In such systems, during the preliminary rotations of the record while the pick-up is traversing the run-in groove toward the beginning of the recording proper, a very low signal level is encountered, which is provided solely by noise signals. In view of this low level, a very small voltage would appear across the time-constant circuit 71, producing a small current through load resistor 82 and leaving the control amplifier cathode 34 at a low positive potential. Accordingly, control amplifier 18 would then be conditioned for maximum amplification, which would produce an amplified version of such undesired noise at the output terminals 61, 62. Although this run-in period extends only from 1 to 5 seconds, such noise is highly objectionable.

According to the present invention, such noise is cut out by the operation of muting switch 87, which is kept closed by the same mechanism actuating the loud speaker cut-out during the period that the changer mechanism is operating; however, switch 87 is opened as soon as the phonograph pick-up enters the run-in groove. The details of the mechanism for actuating the muting switch 87 are not given herein, since they are well known and conventional in the art, and such details form no part of the present invention. While closed, switch 87 connects cathode 69 to the junction 88 of the voltage divider 89, 91, and thereby impresses a relatively high positive voltage upon the time-constant circuit 71 to charge condenser 73. For example, if the maximum voltage of the time-constant circuit 71 normally encountered in practice is of the order of three volts, the closing of switch 87 might produce a voltage across the time-constant circuit of 4.5 volts. This voltage, of course, causes large current to flow through load resistor 82, and elevates the potential of control tube cathode 34 substantially to the cut-off point, so that no noise signals are transmitted to the output terminals 61, 62. As indicated, muting switch 87 is opened as soon as the pick-up enters the run-in groove. Thereafter the high voltage across the time-constant circuit condenser 73 leaks off through resistor 72 (and also to some extent through resistors 74, 83 and 86) until the recorded signal is picked up, whereupon the circuit operates as indicated above. In this manner, for a period of from two to three seconds after the pick-up contacts the run-in groove, the amplification of control amplifier 18 increases from the cut-off value in a gradual manner, until the desired input signal is derived. In this way, any noise incident to the preliminary operations prior to the commencement of reproduction of the desired signal is substantially minimized. Of course, the 2 to 3 second interval can be increased where necessary or desired.

Further noise suppression during low-level reproduction is provided by resonant circuit 45 in the output of control signal amplifier 42. This circuit 45 is tuned to a frequency above the usual recorded audio frequencies but within scratch and noise frequency ranges, such as 6000 to 8000 cycles per second. The effect of circuit 45 is to enhance the amplitude of noise frequency signals so that an appreciable input to rectifier 68 is provided even during run-in periods, whereby amplifier 18 is biased to a moderate amplification level, and maximum amplification of noise alone is prevented. It will be understood that, where such an effect is not desired, circuit 45 may be omitted, in which case anode 52 is connected directly to load resistor 53.

In a circuit of this type which was actually built and tested, control tube 18 was of the 6L7 type, amplifier tubes 41, 42 were provided by the two sections of a double-triode tube of the 6SN7 type. Rectifier 68 and cathode follower 76 were also provided by the two sections of a similar 6SN7 tube, the grid and anode of one section being coupled together to provide a diode as indicated at 68. The plate supply terminal B was maintained at plus 390 volts. The bias supply terminal C was maintained at minus 55 volts. The plate supply for control tube 18 at terminal A was maintained at plus 150 volts. The zero-compression potential of control tube cathode 34 was maintained at plus 1.5 volts, requiring a potential for control grid 75 of minus 9 volts. Under these circumstances, a change of 400-cycle input signal level of ±30 decibels resulted in a change of output level of only ±1.5 decibels, indicating a very wide range of control action. Furthermore, low input signal levels were brought up to a useful value, while very high input signal levels were reduced to the desired value. In each instance, no appreciable distortion could be perceived, and the fast attack and slow decay feature of the invention rendered the output signal perfectly normal in hearing sensation, with the greater hearing comfort of more uniform level. However, any abrupt changes in level were communicated temporarily to the output circuit to produce the same sensation as though the audio automatic volume control system of the present invention were entirely omitted.

While the present invention has been specifically described with respect to certain specific tubes and elements it is to be understood that any other equivalent tubes or elements could be used equally well. Thus, for the control tube 18 any remote cut-off amplifier could be used. For tubes 41 and 42, any suitable amplifier tubes could be used, including triodes, tetrodes, pentodes, etc. Similarly, any conventional type of diode tube could be used in place of rectifier 68, or even a dry rectifier, such as of the selenium, germanium, or copper-oxide type, could be used. Likewise, any suitable cathode-coupled tube could be substituted for tube 76.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim as my invention:

1. An audio automatic volume control circuit for maintaining substantially constant output signal level over a wide range of audio input signal level variations comprising a remote cut-off control amplifier having an anode, a control grid and a cathode; an audio input circuit having one terminal coupled to said control grid and another terminal coupled to said cathode through a condenser and adapted to impress therebetween audio input signals having a wide range of variation of amplitude level; an audio output circuit coupled to said anode; a rectifier circuit coupled to said output circuit and including a rectifier tube in series with a circuit having a long time-constant for audio frequencies, whereby the unidirectional voltage across said time-constant circuit represents the average level of said audio input signals; a cathode-coupled circuit including a tube having a control grid coupled to the high potential terminal of said time-constant circuit and a cathode coupled through an output resistance and a source of negative biasing potential to the low potential terminal of said time-constant circuit; said input terminal also being connected to said low potential terminal; and said latter cathode and said control amplifier cathode being directly interconnected and said source having a voltage producing a minimum bias for said control amplifier in the absence of voltage across said time-constant circuit; whereby a voltage across said time-constant circuit increases said control amplifier bias to a new operating point, and increases in level of said audio input signals are relatively quick to increase said bias to reduce the level of audio output signals from said amplifier, while decreases in audio input signal level are relatively slow in causing decrease of said bias to increase the level of said audio output signals.

2. An audio automatic volume control circuit for maintaining substantially constant output signal level over a wide range of audio input signal level variations, comprising a remote cut-off control amplifier having an anode, a control grid and a cathode, an audio input circuit coupled between said grid and said cathode and including a condenser, rectifier means for deriving a unidirectional signal corresponding to the average audio output signal of said amplifier, an electron tube circuit actuated by said unidirectional signal and having a cathode load resistor connected to said control amplifier cathode to control the potential of said cathode in accordance with the average level of said control amplifier output signal, said amplifier cathode and said electron tube cathode being directly interconnected and being coupled to ground only through said condenser or said resistor, whereby said average level is maintained substantially constant despite wide variations in signal level applied to said control amplifier input circuit and whereby said automatic volume control circuit has fast attack and slow decay characteristics.

3. An audio automatic volume control circuit for maintaining substantially constant output signal level over a wide range of audio input signal level variations, comprising a control thermionic amplifier having an audio input circuit adapted to be connected to a source of varying level audio signals and also having an audio output circuit, rectifier means coupled to said output circuit and including a time-constant circuit for producing a unidirectional control signal corresponding to the average level of said audio signals, an electron tube circuit coupled to said time-constant circuit to be controlled by said control signal and having an output resistance in its cathode circuit, and a biasing circuit for the cathode of said control amplifier comprising a condenser connected to said cathode in said control amplifier input circuit and also comprising a direct connection from said cathode to said output impedance, whereby the signals appearing in said output circuit have substantially uniform level whereby said automatic volume control circuit has fast attack and slow decay properties.

4. An audio automatic volume control circuit for maintaining substantially constant output audio signal level over a wide range of input audio signal level variations, comprising a variable-gain control amplifier adapted to be supplied with said variable level audio input signals, and a cathode-biasing circuit for said amplifier comprising a rectifier circuit responsive to the output of said amplifier for producing a control signal corresponding to the average level of said input audio signals, an electron tube circuit responsive to said control signal and having a cathode and a cathode load resistor, a direct connection from said latter cathode to said amplifier cathode, and a condenser connected in series with said amplifier cathode and in the input circuit of said amplifier, whereby the amplification of said amplifier is controlled by said control signal to produce substantially uniform-level signals in the output of said amplifier, and whereby said automatic volume control circuit is more quickly responsive to increases in input audio signal level than to decreases therein.

HILYER A. DU BOIS.

REFERENCES CITED

The following references are of record in the file of this patent:

UNITED STATES PATENTS

| Number | Name | Date |
|---|---|---|
| 1,933,148 | Perkins | Oct. 31, 1933 |
| 1,984,450 | Acenes | Dec. 18, 1934 |
| 1,992,019 | Taylor | Feb. 19, 1935 |
| 2,008,824 | Hammond, Jr. | July 23, 1935 |
| 2,013,297 | Black | Sept. 3, 1935 |
| 2,041,150 | Roberts | May 19, 1936 |
| 2,144,221 | Hollingsworth | Jan. 17, 1939 |
| 2,186,825 | Dome | Jan. 9, 1940 |
| 2,265,394 | Ranly | Dec. 9, 1941 |
| 2,304,331 | Belar | Dec. 8, 1942 |

FOREIGN PATENTS

| Number | Country | Date |
|---|---|---|
| 407,317 | Great Britain | Mar. 13, 1934 |